United States Patent [19]

Wnek

[11] 4,171,759
[45] Oct. 23, 1979

[54] CONVERTIBLE SKI CARRYING APPARATUS

[76] Inventor: Kenneth A. Wnek, 111 E. Broad St., Bethlehem, Pa. 18018

[21] Appl. No.: 921,969

[22] Filed: Jul. 5, 1978

[51] Int. Cl.² ............................................. B60R 9/00
[52] U.S. Cl. .......................... 224/45 S; 280/11.37 A; 224/917
[58] Field of Search ................ 224/42.1 R, 42.1 E, 224/42.1 F, 42.1 G, 42.45 R, 29 R, 45 S; 211/605 K; 280/11.37 K, 11.37 A, 11.37 C; 248/360

[56] References Cited

U.S. PATENT DOCUMENTS

| 3,307,759 | 3/1967 | Fulton | 224/45 S |
| 3,325,069 | 6/1967 | Fulton | 224/42.1 R |
| 4,084,735 | 4/1978 | Kappas | 224/42.1 E |

Primary Examiner—Robert J. Spar
Assistant Examiner—Kenneth Noland
Attorney, Agent, or Firm—Ruth Moyerman

[57] ABSTRACT

A convertible carrier for skis in which skis are contained in a hand carrier portion which allows easy transportation of skis to the slope and, at the same time, is capable of being slidably attached and locked to a bracket portion which remains permanently fixed on the automobile. An auxiliary locking mechanism allows the carrier to be locked to a tree, etc., at the slope.

The carrier housing is L-shaped with a handle attached to one leg of the L. Skis rest on their side on the other leg of the L. A locking mechanism is interconnected with the handle by a bar of the lock which fits into a groove of the handle shank. The shank extends through the housing and through an opening the bracket plate, thus preventing the carrier from being released from the bracket. To release the carrier from the bracket, a key is inserted in the lock and rotation of the key rotates the bar from the groove in the handle shank. The handle shank is thus released and may be pulled upwardly by the handle gripping part out of the plate so that the carrier may be slidably removed from the permanent bracket and/or the skis may be removed from the carrier.

6 Claims, 5 Drawing Figures

CONVERTIBLE SKI CARRYING APPARATUS

BACKGROUND OF THE INVENTION

1. Field of the Invention

This invention relates to package and article carriers and more particularly to ski carriers.

2. Prior Art

Skiiing is increasing in popularity every day. People in ever-increasing numbers are enjoying the healthful and recreational benefits of this sport. In as much as the number of areas of the country with ski slopes is confined to a very small section, there is an increasing need for better means to transport the skis and other equipment by automobile to the base of the slopes and from there to the ski areas. Carriers for attaching and holding skis on the exteriors of cars are well known and extensively in use.

It is also a well recognized fact that skis and ski equipment are extremely expensive and there is a need to handle this equipment with some care to prevent its damage. A third consideration relates to preventing theft of this valuable and expensive equipment.

The biggest disadvantage with conventional car carriers for skis is their lack of adequate anti-theft provisions, the clumsiness of using them and their lack of true versatility.

Skis are also extremely bulky and carrying them, especially in winter when people are bundled up and have gloves, can lead to awkwardness in handling the equipment. Thus, to unload the skis from the car and then transport them to the slopes may result in their being damaged.

There is, therefore, a need for a ski carrier which will combine convenience and ease of use. Furthermore, it would be an advantage to have a ski carrier which could be removed from a car while still containing the skis and then serve as a hand carrier for use on the way by foot to the ski slopes. Such a carrier would need a locking arrangement which is both effective and simple. The carrier should avoid bulkiness, be adaptable to different ski designs and be constructed so as to be easily removed from the car brackets and also allow for easy removal and re-insertion of skis. An added benefit would be realized with a ski carrier which also included means to lock the carrier to a tree, post, etc., at the slope.

SUMMARY OF THE INVENTION

The aforesaid prior art problems are solved by the ski carrier of this invention in which a light weight convertible ski carrier is provided.

In the ski carrier of this invention, skis are contained within a carrier portion which includes a handle means and novel locking arrangement. The carrier easily fits onto bracket means which are attached to the user's automobile. In use, the skis are placed in the carrier and strapped down. The user then mounts the carrier on the automobile by sliding the carrier onto a bracket mounted on the automobile body. The carrier fits the bracket because of an opening in the carrier floor. The user then pushes down on the handle means, forcing a shank extension of the handle to pass downward through the carrier floor and through an opening in the bracket. Locking prevents retraction of the handle. At destination, the carrier is unlocked. An upward pull on the handle retracts the shank from the bracket plate and the carrier may then be slid away from the bracket. At the slope or lodge, the carrier may be locked to a tree or post by similar operation of the handle which, in this instance, releasably engages a looped strap which may be passed around the tree or post.

It is, therefore, an object of this invention to provide a lightweight, inexpensive, hand-held carrier for skis.

It is yet another object of this invention to provide a small easy to handle carrier for skis which, together with bracket means on an automobile, provides a method for transporting skis by car.

It is still another object of this invention to provide inter-connected handle and locking means whereby the ski carrier may be removed from the brackets and carried by hand to the ski slopes.

It is a further object of this invention to provide means whereby, at the ski slope, said convertible carrier may be attached and secured to an object such as a tree or post so that theft of the skis while they are in the carrier but away from the automobile is prohibited.

These and other objects will be more readily ascertainable to one skilled in the art by reference to the accompanying drawings and exemplary embodiments that follow.

DETAILED DESCRIPTION

Figure 1:
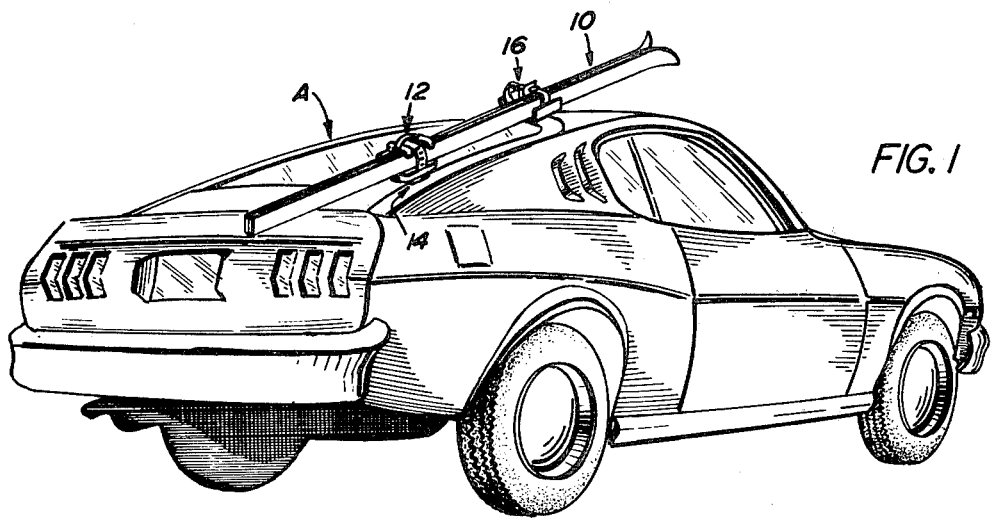
FIG. 1 is a perspective illustrating the carrier of this invention mounted on an automobile.

Referring now to the drawings and more particularly to FIG. 1, automobile A is shown in perspective with the convertible ski carrier of this invention attached. Skis 10 are shown mounted in carrier 12. Carrier 12 is mounted on bracket 14. The automobile illustrated in FIG. 1 is a "hatch-back", and consequently bracket 14 is mounted on the automobile frame at the edge of the back window. Braces 16 are shown also mounted on the frame at the back edge of the window of automobile A. Braces 16 function to restrain the skis from too much wobbling during the driving of the automobile.

Figure 2:
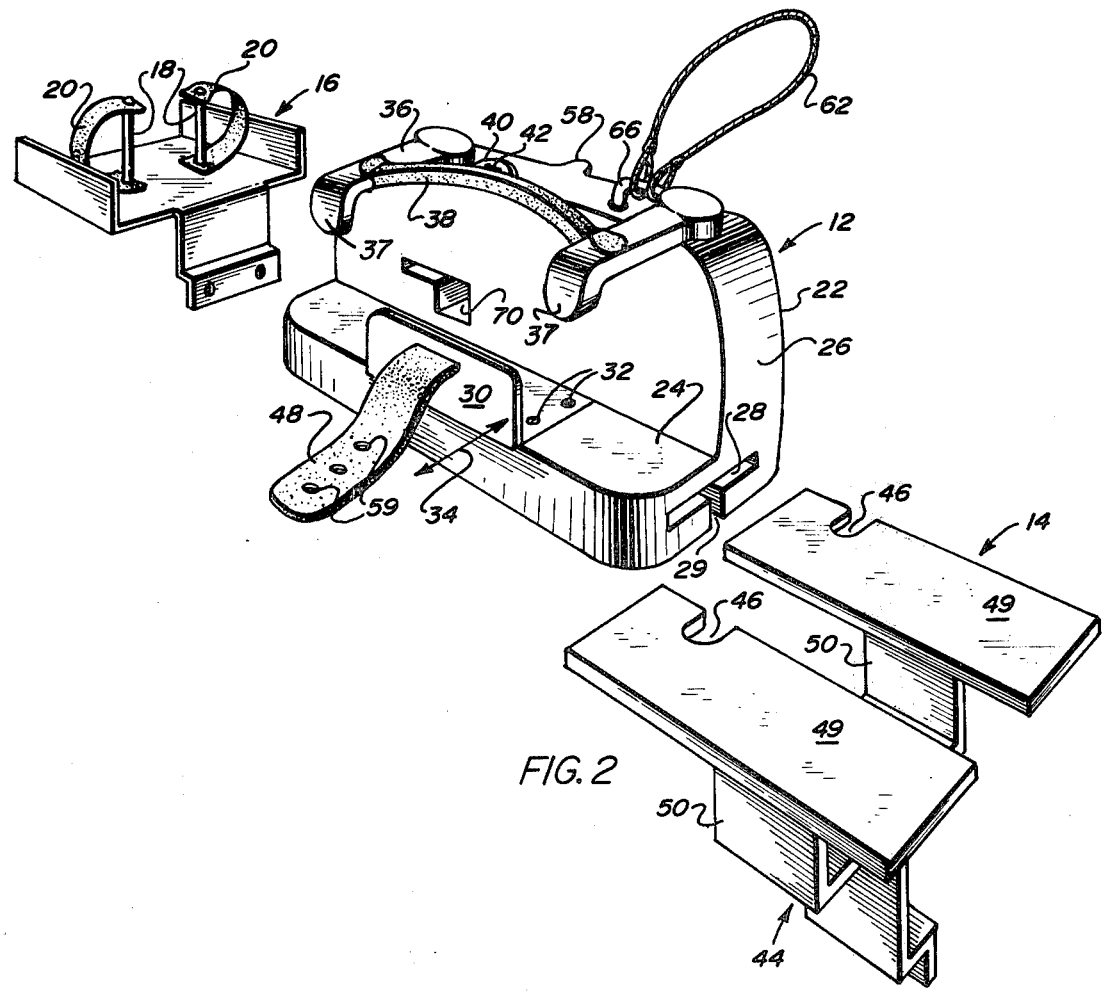
FIG. 2 illustrates the preferred embodiment of the carrier of this invention including bracket plates and ski braces.

Referring now to FIG. 2, a close-up of the carrier of this invention is shown in more detail. As referenced above, brace 16 is shown with pin 18 and straps 20. Straps 20 are of flexible materials such as plastic or rubber and, after positioning the skis in the carrier on the automobile, each pair of skis is braced by wrapping one of straps 20 around the skis and snapping the strap onto the top of pins 18.

Referring now to the ski carrier itself, carrier 12 includes housing 22. Housing 22 is generally L-shaped, of rigid construction and includes floor portion 24 and side portion 26. Housing 22 is shown also containing a longitudinal opening 28 with slot portion 29 in housing floor 24. The purpose of the longitudinal opening is to receive brackets 14 as will be described in more detail later. Housing 24 is also shown with L-shaped plate 30 which operates to adjustably hold and retain skis while positioned within the carrier. Plate 30 is held to floor 24 by screws 32. Housing 22 is slotted at the intersection between floor 24 and side 26. Slot 33 functions to permit plate 30 to be adjustably positioned as shown by arrows 34 to widen or narrow the space available on floor 24 to accommodate skis. Simply unscrewing screws 32 and adjustment of plate 30 and rescrewing the screws will enable adjustability of the carrier to accommodate the myriad of different ski widths now available on the market. Strap 48 is shown attached at its one end to plate 30. After the skis are in position in the carrier, strap 48 is pulled over them, passed under handle gripping bar 38 and attached to knob 58 by inserting knob 58 in one of strap holes 59.

Carrier 12 is also shown with handle means 36 shown in FIG. 2 in the locked or lowered position. Handle means 36 is preferably in the shape of an inverted U. The method by which the handle cooperates with the locking means will be explained more fully in reference to FIG. 3. Handle 36 includes handle gripping part 38 formed by the bend of the U and overbend section 37. Part 37 helps in retaining the skis in the carrier. A section of shank 39, which in the preferred embodiment is a continuation of one side of the handle, co-operates with the locking mechanism as will be more fully explained in regard to FIG. 3. Lock 40 is also shown partially in FIG. 2. The part of lock 40 shown in FIG. 2 is confined to keyhole 42. Opening 70 in carrier 12 will be discussed with reference to FIG. 4.

FIG. 2 also includes a view of brackets 14 shown as duplicate brackets designed to accommodate a pair of ski carriers, although in FIG. 2 only one ski carrier is illustrated. Bracket 14 is shown in FIG. 2 with automobile attachment section 44 which comprises a step series of bends in plate 50 designed to fit a "hatch-back" automobile. Bracket plate 49 is of a size to mate with opening 28 in housing floor 24 and slot 29 permits passage therethrough of plate 50 when carrier 12 is mounted on bracket 49. A most important feature of bracket 14 in reference to this invention is opening 46, shown in FIG. 2 as a notch. Opening 46 may also be annular or any other shape appropriate to accommodate a shank section of the locking means which will be explained later.

Figure 3:
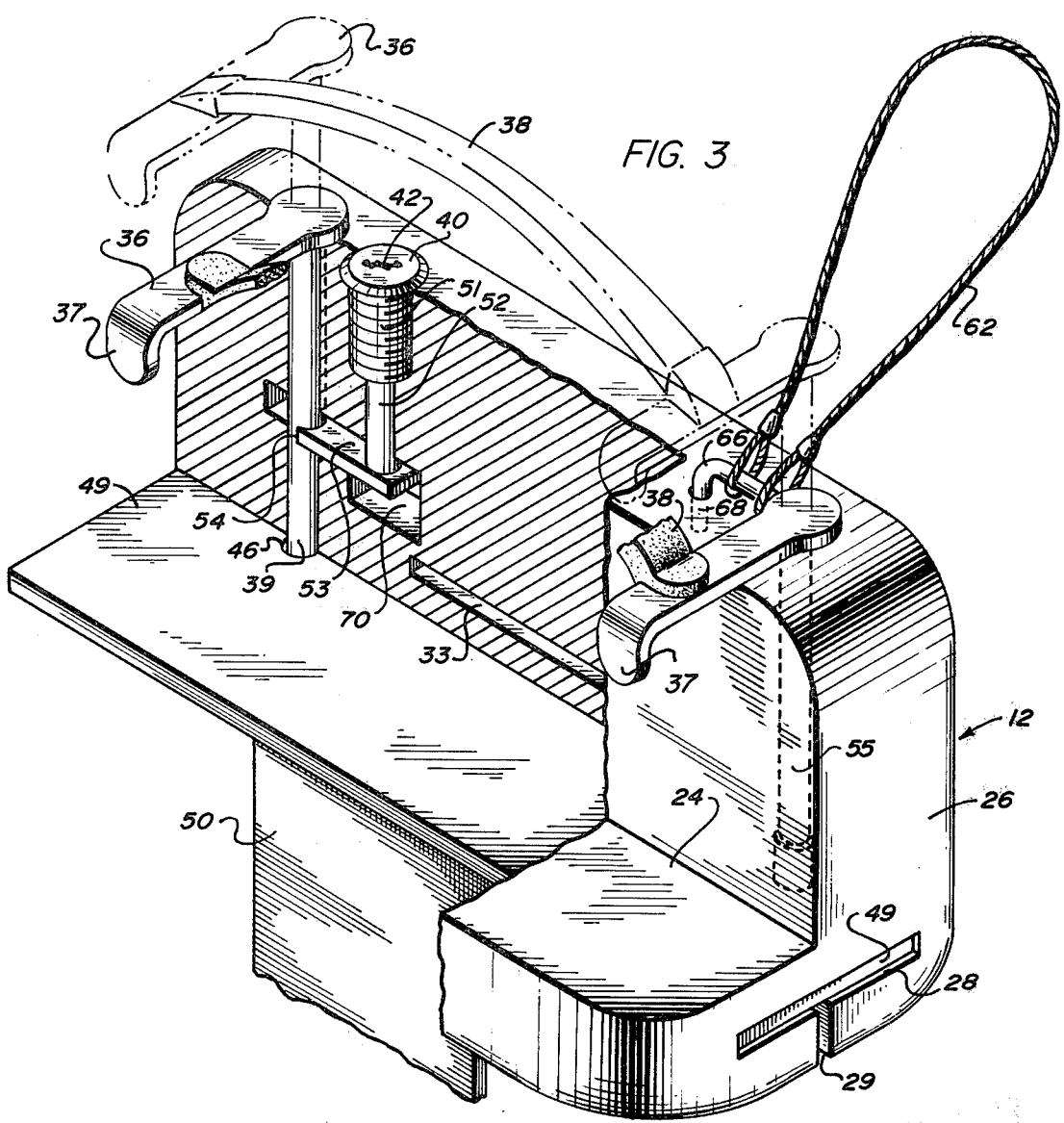
FIG. 3 shows a fragmentary isometric of this invention.

Referring now to FIG. 3, a fragmentary isometric view of the preferred embodiment is shown. In FIG. 3, carrier 12 is shown mounted on bracket 14 and in the locked position. The user first conveniently puts the skis in the carrier and then the carrier is mounted on the bracket by sliding the carrier onto plate 49 of bracket 14 by virtue of slot 28 in flooring 24. The user then exerts a downward pressure on handle gripping bar 38 (shown partially cutaway in this view). Handle gripping bar 38 is part of handle 36. Shank 39 is slidably mounted in housing 22 and is of sufficient length to pass through plate 49 via notch 46. To lock the device, a key is inserted in keyhole 42 of lock 40 after the handle is pushed down. Lock 40 operates through a tumbler mechanism of the conventional type within casing 51 and turning the key to the locked position causes shaft 52 to turn clockwise. Bar 53 also rotates clockwise and slips into groove 54 of shank 39. Once bar 53 enters groove 54, the upward mobility of handle 36 is prevented. Likewise since shank 39 extends through opening 46 in plate 49, the ability to slide carrier 12 off bracket 14 and/or removal of skis from the carrier is prevented.

Handle 36 also includes another side piece, shank 55, on its other end. Shank 55 is also slidably mounted in an opening in housing 22. Since it is unnecessary for both handle side pieces to extend through bracket plate 49, shank 55 may be shorter. Both shanks 39 and 55 contain stops at their ends to prevent the handle from being pulled completely free of the housing. Handle means 36 also optionally includes an auxiliary locking loop 62. Loop 62 is shown with its ends also looped and circumscribing L-bar 66. Bar 66 is permanently attached at one end to handle 36 near shank 55. The other end slips into recess 68 in housing 22. In use, the skier may wish to attach the carrier to a tree or post at the ski slope and may do so by encircling the tree or post with loop 62, slipping the loop ends over bar 66 and locking the carrier by pushing down the handle as previously described. The downward movement of handle 36 causes bar 66 to enter recess 68. It should be noted that when handle 36 is in the down or depressed position, it is not possible to remove the skis from the carrier.

Figure 4:
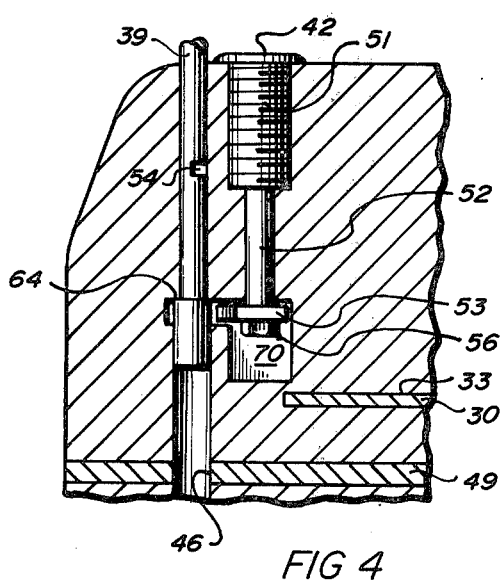
FIG. 4, also a fragmentary, shows details of the locking mechanism.

Referring now to FIG. 4, which is also fragmentary, more details of the locking mechanism are shown. FIG. 4 illustrates the unlocked position. In FIG. 4, shaft 39 is in the up or unlocked position. It may be seen that, in this position, groove 54 appears above bar 53. Stop 64 defines the upper limit to which shaft 39 may rise and prevents it from being totally disengaged from the assembly. It may be seen in FIG. 4 that shaft 39 totally clears plate 49, appearing above notch 46. In operation, the user, to unlock the ski carrier from the bracket, has inserted the key in keyhole 42, turned the key and, through the tumbler mechanism, caused bar 53 to rotate out of groove 54. The user has then pulled upward on the handle, freeing shaft 39 from plate 49.

Opening 70 in housing 22 is included for the purpose of assembling the rotating lock bar 53 to the lock shaft 52.

Figure 5:
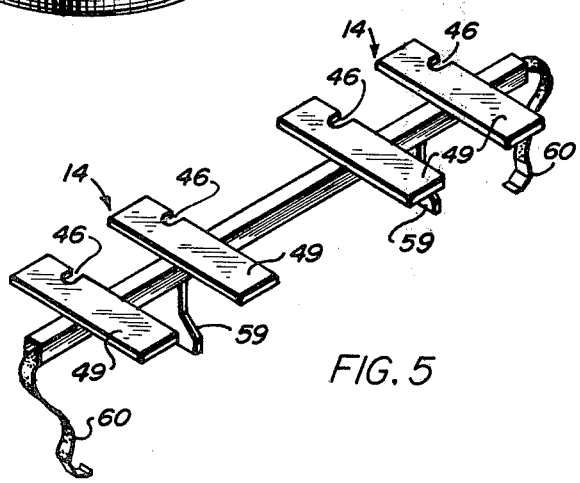
FIG. 5 shows an alternate embodiment of the automobile bracket plates.

Referring now to FIG. 5, an example of a type of double bracket suitable for mounting on top of a car is shown. Bracket assembly 59 is of a conventional type designed to fit the roof of automobiles and fasten to the automobile roof in a conventional manner by means of strap 60 which hooks into the rain gutter of the car. Again, it should be noted that the essential feature in regard to brackets 14 is that plate 49 must include opening 46 to allow passage for the shank section of the locking mechanism. The difference in bracket assembly 59 and bracket 14 in FIGS. 2 and 5 relates merely to providing attachment to the particular make or model of automobile and necessary changes in the shape or style of bracket assembly 59 is well within the ability of one of ordinary skill in the art. It should also be appreciated that FIG. 5 illustrates bracket means designed to accommodate four convertible carriers of this invention.

There are many variations which may be practiced within the scope of this invention.

The material of construction of the convertible carrier of this invention may conveniently be molded plastic, wood or metal, or any other material of construction which will impart sufficient rigidity and strength. Molded plastic is preferred because it is generally more lightweight.

While the preferred embodiment illustrates the locking shank as an extension of the handle, it is possible to separate the handle portion from the locking mechanism and have a shank which may be pressed down with, for example, one's thumb and the handle itself, in this later instance, could be non-movable.

As to the actual locking mechanism, the tumbler assembly is of a conventional manufacture such as a cabinet door lock, or others sold for this purpose and which may be seen in daily use as locks for household doors, bicycles, etc.

Loop strap 62 should be provided as a high-strength material such as steel cable or other similar material to discourage theft by cutting or breaking the loop while the carrier is attached to a structure at the ski slope.

It should be appreciated that by a generally L-shaped housing it is also meant to include an inverted T-shape wherein skis would be carried on each side of the bar.

It is preferred that handle gripping bar 38 be centered in such a way as to be above the center of gravity of the device when loaded with skis so that when the skier is carrying the skis, there is no tendency for the device to tilt or cock in the hand.

L-shaped plate 30 and strap 48 are but one of many possible means for restraining the skis from falling out of the carrier. Other arrangements in which plate 30 is eliminated and strap 48 performs the total function or vice versa are also included within the scope of this invention. Locking shank 39 is shown as a cylindrical and preferably metal shaft, but the shape is not meant to be limiting as other shapes and sizes are intended to be included. Likewise, notch 46 may appear further within the plate in which case the opening should be annular or such other size as is necessary to accommodate the locking shaft.

There are many advantages to the convertible ski carrier of this invention. The carrier is lightweight, easy to use, and is widely adaptable to all shapes and sizes of skis.

The convertible ski carrier of this invention is easy to operate even though the user may be wearing gloves due to cold weather. The auxiliary looping lock adds great versatility as protection is offered to the carrier itself while the user is skiing and also may be used to give protection from theft to the skis while the user is otherwise occupied at the slopes.

While the device of this invention has now been illustrated and described, it is not meant for such description to limit the invention, but rather that the invention be limited only by reasonable interpretation of the appended claims.

What is claimed is:

1. A convertible carrier for skis comprising:
 (a) a generally L-shaped housing including a floor portion and a side portion, said floor portion having sufficient length and width to receive at least one pair of skis resting in parallel juxtaposition, and where said skis are supported on their longitudinal edge by said floor portion, said side portion being of sufficient height to provide lateral support for said skis, said floor portion also including a longitudinal opening, said opening being of a shape and size to permit the insertion therein of a bracket plate which is externally mounted from said housing;
 (b) handle means to provide hand carrying of said carrier and said handle means also providing means to retain said skis within said housing, said handle means including a shank portion containing at least one recess positioned intermittent its length to receive an extension bar section of a locking mechanism;
 (c) bracket means including said bracket plate adapted to be mounted on a vehicle body, said bracket plate adapted to slidably mate within said longitudinal opening, said bracket plate including an opening to receive and permit passage therethrough of said shank whereby when an end of said shank extends into said opening, sliding of said carrier from said bracket plate is prevented; and,
 (d) locking means interconnected with said handle means and said shank so that when said shank is slidably mounted in said housing, said extension bar section operably connects with said locking mechanism so that unlocking of said locking mechanism operates to release said extension bar section from a recess of said shank.

2. The ski carrier according to claim 1 wherein said handle means which also comprises the retainer means includes an L-shaped plate adjustably mounted transversly to said housing floor to accommodate skis of different sizes, said skis resting on one arm of the L-shaped plate and another arm of said L-shaped plate acting as a retaining wall to provide lateral support for said skis.

3. The ski carrier of claim 1 or 2 wherein said handle means comprises a generally inverted U-shaped handle interconnected to said locking means wherein a bend of said U-shaped handle comprises a hand gripping portion.

4. The ski carrier according to claim 1 comprising additionally an auxiliary locking means to attach said carrier to a fixed object, said auxiliary locking means including a length of flexible material the ends of which are looped and adapted to slide on said handle means when said handle means is in the unlocked position.

5. The ski carrier according to claim 4 in which said handle means include a generally L-shaped bar, one end of which is secured to said handle at such a height so that the other end of said bar will project downward into a recession in said carrier when said handle means is locked, said bar being adapted to receive said looped ends.

6. The ski carrier according to claim 1 wherein said carrier includes, additionally, strapping means for additionally retaining said skis, one end of which is adapted to be attached to said floor portion and the other end of which is adapted to be attached to said side portion.

* * * * *